United States Patent Office.

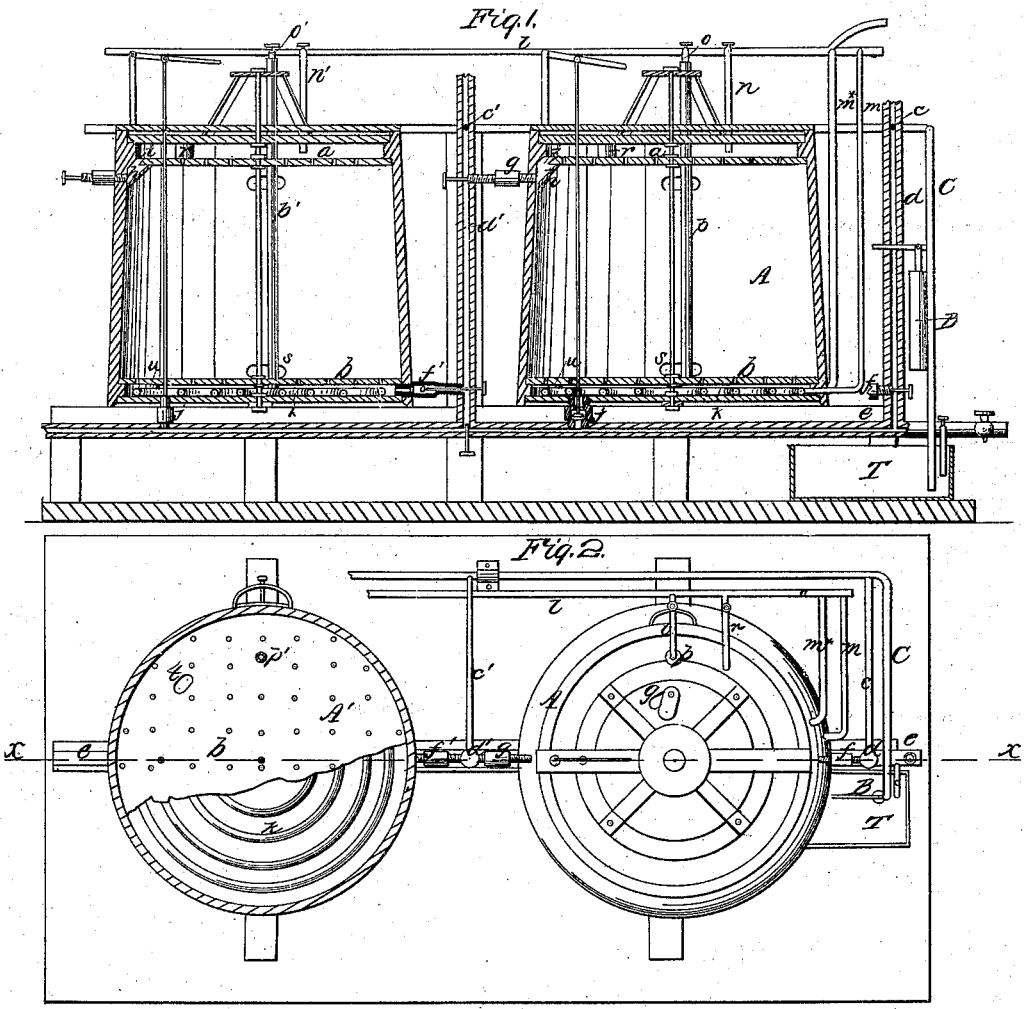

ABRAHAM STEERS, OF NEW YORK, N. Y., ASSIGNOR TO HIMSELF, HENRY L. ELDER, AND
S. H. KENNEDY, OF PHILADELPHIA, PENNSYLVANIA.

Letters Patent No. 68,010, dated August 20, 1867.

IMPROVEMENT IN LEACHING TAN-BARK.

The Schedule referred to in these Letters Patent and making part of the same.

TO ALL WHOM IT MAY CONCERN:

Be it known that I, ABRAHAM STEERS, of the city, county, and State of New York, have invented a new and useful Improvement for the Leaching of Tan-Bark; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention, taken in the plane indicated by the line $x$ $x$, fig. 2.

Figure 2 is a plan or top view of the same.

Similar letters of reference indicate like parts.

This invention relates to a new process for leaching tan-bark, in which the ground bark is first washed out cold with water or weak tanning-liquor, then heated with steam, and finally washed out with water let on from below. The tan-bark to be extracted is enclosed in a leach, by preference round and detached, and provided with a perforated false bottom and a perforated false top, between which the tan-bark is enclosed. The menstruum is admitted from below through the false bottom, and passed from one leach to the other, and after all the strength has been extracted which can be got out by a cold menstruum, the bark is steamed from below, and the menstruum is again let on in an upward current, so that the formation of channels in the bark is prevented, and the menstruum is not permitted to run through the bark without washing out its strength.

A A represent a series of leaches, made of wood or any other suitable material, and round, in preference to any other form, because in a round leach the menstruum and the steam are enabled to act on the bark more uniformly than in a leach with a square or angular cross-section. Each leach is provided with a perforated false top, A, and a perforated false bottom, $c$, and the space between this false bottom and top is filled with tan-bark or other material to be extracted. The menstruum used in washing out the bark is injected by a pump, B, and pipe, C, which connects with the first leach by means of a branch pipe, C, and with the second leach by a branch pipe, C', and so on. The branch pipes C C' lead to upright tubes $d$ $d'$, which rise from a horizontal trough or channel, and which communicate with the leaches by stop-valves $f$ $f'$ leading to the spaces below the false bottoms $b$. A stop-valve, $g$, also forms a connection between the leach A and the second upright tube $d'$, and this stop-valve extends from an annular space, $h$, just below the top $a$, and communicating with the space above said false top through a series of channels, $i$. A similar stop-valve connects the second leach with the third upright tube, and so forth. Stop-valves $j$, which are opened and closed from the tops of the leaches, are inserted in the bottoms of said leaches, and form a direct communication between the spaces below the false bottoms and the horizontal trough or channel $e$, and the spaces below said perforated false bottoms are occupied by steam-coils $k$, which are supplied with steam through a pipe, $l$, and branch pipes $m$. From said steam pipe extend also the branch pipes $n$ $o$, the former into the space above the perforated false tops, and the latter into upright tubes $p$ $p'$, leading down through the leaches in the spaces below the perforated false bottoms. Instead of injecting live steam through the pipes $l$ $m$ $n$ $o$, exhaust steam may be injected into the leaches through pipes $m^*$. The leaches are charged through man-holes $q$ in their tops, and through tubes $r$ extending from said man-holes down in the spaces below the perforated false tops, and they are discharged through holes $s$ in their sides, and through other holes $t$ and tubes $u$ in their bottoms. All these holes or tubes are closed by suitable man-hole plates, which can be readily and easily removed.

The operation is as follows: The spaces between the perforated false bottoms and tops in the leaches are filled with ground bark, and cold water or weak tan-liquor is pumped through the pipe C and tube $d$ into the bottom part of the first leach, causing the liquid to rise through the perforated false bottom, and through the ground bark to the space above the perforated false top, whence it passes through the stop-valve $g$, which must be open, and through the tube $d$ and valve $f$, which is also open, into the bottom part of the second leach, where it rises again through the bark, and so on through the entire series of leaches. From the last leach the menstruum is caused to flow back through the channel $e$ to the tank T, whence it is again injected into the first still and caused to pass through all the stills, until it has reached the requisite strength. The menstruum, being passed in an upward direction through the bark, is diffused more evenly through the entire mass, and the formation of channels in the bark is prevented, whereas in downward leaching the menstruum is liable to form channels in the bark through which it passes, and a large percentage of the bark is not brought in contact with the menstruum. Furthermore, by treating the bark first with cold water, much of the strength is extracted which cannot be reached if the bark is heated at the beginning of the operation. After the bark has been sufficiently extracted by the action of the menstruum, I stop the operation of the pump B, and let on steam, using live or exhaust steam, either direct or through the medium of the coil $k$, and after having heated the bark by the action of the steam, I start the pump again, and by these means the full strength of the bark is extracted. In order to drive the liquor from leach to leach, I let on steam from above, and by the perforated false tops or perforated sectional guard or channel $h$, the bark is prevented from passing into the pipes with the liquor. For the purposes of tanning, there should be a sufficient number of leaches to have the liquor thrown into them from the back leaches cold. The forward leach or leaches, which contain the fresh bark, and from which is drawn the liquor for use, are used as filterers to obtain better conditioned liquor for tanners' purposes, and said leach or leaches are also desirable for the purpose of more perfectly damping and preparing the bark to receive heat without loss or injury to the quality or quantity of the extractable tanning or astringent salts inherent in the bark. By the action of the pump, an impelled current of liquor or water is forced through the leaches, and the force of the pump can be assisted by the action of the steam. By this forced current all obstructions which may form in the pipes are forced out, and the apparatus is always kept in proper working order.

What I claim as new, and desire to secure by Letters Patent, is—

1. Passing the menstruum through the bark contained in the leach or leaches in an upward instead of in a downward direction, substantially as and for the purpose described.

2. Heating the bark with live or exhaust steam, after the same has been partially extracted by the cold menstruum, and then washing it out with water or weak tan-liquor, substantially as and for the purpose set forth.

3. The use of the perforated false top or perforated guard-channel $h$ in combination with the still, to prevent the bark from passing into the pipes with the liquor, substantially as described.

4. The use of a forced current of liquid or fluid through the matter operated on, and the adjustment of the second connecting pipes and valves for that purpose, whereby the force of the pump can be used to clear out obstructions in the piping, as set forth.

5. Forcing the liquor through a series of leaches by the action of a pump, or by means of steam, or both combined.

ABRM. STEERS.

Witnesses:
   WM. F. McNAMARA,
   ALEX. F. ROBERTS.